United States Patent
Namkoong et al.

(10) Patent No.: US 11,905,974 B2
(45) Date of Patent: Feb. 20, 2024

(54) SUCTION DAMPING CASE

(71) Applicant: Hanon Systems, Daejeon (KR)

(72) Inventors: Kyu Namkoong, Daejeon (KR); Seong Gyu Gong, Daejeon (KR); Eun Gi Son, Daejeon (KR); Bok Ki Park, Daejeon (KR); Hew Nam Ahn, Daejeon (KR)

(73) Assignee: Hanon Systems, Daejeon (KR)

( * ) Notice: Subject to any disclaimer, the term of this patent is extended or adjusted under 35 U.S.C. 154(b) by 393 days.

(21) Appl. No.: 17/042,332

(22) PCT Filed: May 29, 2019

(86) PCT No.: PCT/KR2019/006462
§ 371 (c)(1),
(2) Date: Sep. 28, 2020

(87) PCT Pub. No.: WO2020/004821
PCT Pub. Date: Jan. 2, 2020

(65) Prior Publication Data
US 2021/0102556 A1    Apr. 8, 2021

(30) Foreign Application Priority Data

Jun. 27, 2018   (KR) .................. 10-2018-0074060

(51) Int. Cl.
| | |
|---|---|
| F04D 29/66 | (2006.01) |
| B60H 1/32 | (2006.01) |
| F04D 29/063 | (2006.01) |
| F04D 29/42 | (2006.01) |

(52) U.S. Cl.
CPC ......... *F04D 29/667* (2013.01); *B60H 1/3223* (2013.01); *F04D 29/063* (2013.01); *F04D 29/4213* (2013.01)

(58) Field of Classification Search
CPC ............... F04D 29/4213; B60H 1/3223; F04B 27/0891; F04B 27/08; F04B 27/1081; F04B 27/1009; F05B 2210/14
See application file for complete search history.

(56) References Cited

U.S. PATENT DOCUMENTS

| | | |
|---|---|---|
| 2007/0020132 A1 | 1/2007 | Bhatia et al. |
| 2009/0136366 A1 | 5/2009 | Taguchi |

FOREIGN PATENT DOCUMENTS

| | | |
|---|---|---|
| CN | 2837618 Y | 11/2006 |
| CN | 203148036 U | 8/2013 |
| CN | 207485632 U | 6/2018 |

(Continued)

OTHER PUBLICATIONS

International Search Report issued in PCT/KR2019/006462 dated Aug. 23, 2019.

*Primary Examiner* — Courtney D Heinle
*Assistant Examiner* — Danielle M. Christensen
(74) *Attorney, Agent, or Firm* — Norton Rose Fulbright US LLP; James R. Crawford

(57) ABSTRACT

Disclosed is a suction damping case. A refrigerant introduced into the suction damping case flows for a predetermined period of time at reduced pressure and speed, and then is discharged to the outside of the body, so that a damping function can be made. When the suction damping case is coupled to a rear housing, a hook and an embossing prevents the suction damping case from being separated.

22 Claims, 11 Drawing Sheets

(56) References Cited

FOREIGN PATENT DOCUMENTS

| | | | |
|---|---|---|---|
| DE | 60022820 T2 | 7/2006 | |
| DE | 112013005329 T5 | 9/2015 | |
| KR | 20080086100 A | 9/2008 | |
| KR | 20120037989 A | 4/2012 | |
| KR | 20130092876 A * | 8/2013 | |
| KR | 20140025909 A | 3/2014 | |
| KR | 20140104300 A | 8/2014 | |
| KR | 20160041456 A * | 4/2016 | |
| KR | 20160041456 A | 4/2016 | |
| KR | 20170028156 A | 3/2017 | |
| WO | WO-2011013734 A1 * | 2/2011 | .......... F04B 27/1009 |

* cited by examiner

SUCTION DAMPING CASE

CROSS REFERENCE TO RELATED APPLICATIONS

This patent application is a national phase under 35 U.S.C. § 371 of International Patent Application No. PCT/KR2019/006462 filed May 29, 2019, which claims the benefit of priority from Korean patent application No. 10-2018-0074060 filed Jun. 27, 2018, each of which is hereby incorporated herein by reference in its entirety for all purposes.

FIELD

The present disclosure relates to a suction damping case and more particularly to a suction damping case capable of providing a damping effect instead of a check valve of a variable compressor.

BACKGROUND INFORMATION

Description of the Related Art

In general, an air-conditioning device for heating and cooling a vehicle is equipped with a compressor for cooling. The compressor compresses a low-temperature and low-pressure refrigerant flowing from an evaporator into a high-temperature and high-pressure refrigerant and transmits the refrigerant to a condenser. Recently, a swash plate type compressor is being increasingly used among various compressors.

The swash plate type compressor includes a swash plate which forms a certain inclination angle with a rotary shaft. The swash plate type compressor has a principle in which a piston within a cylinder bore connected to the swash plate performs a reciprocating motion in accordance with the rotation of the rotary shaft, so that the refrigerant is compressed. The swash plate type compressor includes a variable displacement swash plate type compressor and a fixed displacement swash plate type compressor. The discharge capacity of the variable displacement swash plate type compressor is changed depending on the inclination angle of the swash plate. When a cooling load increases, the inclination angle of the swash plate is controlled to increase, and when the cooling load decreases, the inclination angle of the swash plate is controlled to decrease.

In such a swash plate type compressor, a cylindrical suction check valve is installed on the suction side of the rear housing. An example of the suction check valve is disclosed in Korean Laid-Open Patent Application No. 2014-0104300.

The above-described suction check valve is composed of a cylindrical casing having a suction opening formed therein, a base which is coupled to an end of the casing and has a suction hole formed therein, and a core which is inserted into the casing, is supported by a spring, and selectively closes the suction hole and the suction opening.

In the suction check valve, when the refrigerant on the suction side is above a certain pressure, the refrigerant functions to press the core. When the valve is opened or closed, there is a problem that noise is generated by the contact between the core and the case and by the contact between the core and the head. Also, the valve components consist of four parts, which causes the increase of the weight. When the suction check valve is assembled to the rear head, the suction check valve is fixed in a forced press-fitting manner. However, there is a problem in that assemblability is degraded due to a restriction on the pressing depth.

SUMMARY

Technical Problem

The purpose of the present disclosure is to provide a suction damping case capable of providing a damping effect instead of a check valve of a variable compressor.

Technical Solution

Provided is a suction damping case according to a first embodiment of the present disclosure. The suction damping case 300 for a compressor, which is installed between a suction chamber and a suction port formed on a rear housing 100 of the compressor, includes: a body 310 formed with a first section S1 in which one cylindrical end thereof is opened to allow the refrigerant to be introduced thereinto and the introduced refrigerant moves along the inside thereof, and with a second section S2 in which since the other end thereof is blocked by an end wall 302, the refrigerant moves in an axial direction thereof and then comes into contact with the end wall 302, so that the refrigerant flows for a predetermined period of time at reduced pressure and speed; a hook 330 formed integrally with the open end of the body 310; an embossing 350 protruding from an outer circumferential surface of the body 310 lest the body 310 should be rotated by vibration after the body 310 is installed in the rear housing 100; and a plurality of windows 370 formed to pass through the body 310 such that the refrigerant which has passed through the second section S2 is discharged to the suction chamber.

The hook 330 is formed to extend in a longitudinal direction of the body 310 from the end of the body 310. The hooks 330 are arranged to face each other as viewed from the top surface of the case 300 and a hook shape protruding outward is formed asymmetrically with the hooks 330 facing each other.

One end of the embossing 350 is adjacent to the hook 330 and the other end extends in the longitudinal direction of the body 310.

The embossing 350 extends from the hook 330 to the window 370, and the extended end is located between the plurality of windows 370.

When the body 310 is inserted into the rear housing 100, the embossing 350 comes in close contact with an inner circumferential surface of the rear housing 100.

The hook 330 prevents the damping case 300 from moving in an axial direction with respect to a direction in which the damping case 300 is coupled, and the embossing 350 prevents the damping case 300 from rotating in a circumferential direction thereof.

The embossing 350 protrudes in a circumferential direction of the body 310.

The embossing 350 is formed in the longitudinal direction of the body 310 and is located between the hooks 330 formed in the circumferential direction of the body 310.

The windows 370 are spaced at the same interval in the circumferential direction of the body 310.

The suction damping case further includes an oil hole 390 formed in the end wall 302.

The oil hole 390 is formed in a direction in which gravity acts when the body 310 is installed in the rear housing 100.

A hook groove 110 into which the hook 330 is inserted is formed in a position of the rear housing 100, which corresponds to the hook 330.

The window 370 is formed in the first section S1 of the body 310.

Provided is a suction damping case according to a second embodiment of the present disclosure. The suction damping case for a compressor, which is installed between a suction chamber and a suction port formed on a rear housing 100 of the compressor, includes: a body 3100 formed with a first section S1 in which one cylindrical end thereof is opened to allow the refrigerant to be introduced thereinto and the introduced refrigerant moves along the inside thereof, and with a second section S2 in which since the other end thereof is blocked by an end wall 3002, the refrigerant moves in an axial direction thereof and then comes into contact with the end wall 3002, so that the refrigerant flows for a predetermined period of time at reduced pressure and speed; a hook 3300 formed integrally with the open end of the body 3100; an embossing 3500 protruding from an outer circumferential surface of the body 3100 lest the body 3100 should be rotated by vibration after the body 3100 is installed in the rear housing 100; and a plurality of refrigerant holes 3700 which are spaced apart from each other in a circumferential direction and in a longitudinal direction of the body 3100 and are opened at different heights in the longitudinal direction of the body 3100 with respect to the end wall 3002.

The refrigerant hole 3700 is opened outward in a radial shape throughout the circumferential direction of the body 3100.

The hook 3300 is formed to extend in the longitudinal direction of the body 3100 from the end of the body 3100. The hooks 3300 are arranged to face each other as viewed from the top surface of the case 3000 and a hook shape protruding outward is formed asymmetrically with the hooks 3300 facing each other.

One end of the embossing 3500 is adjacent to the hook 3300 and the other end extends in the longitudinal direction of the body 3100.

The hook 3300 prevents the damping case 3000 from moving in the axial direction with respect to a direction in which the damping case 3000 is coupled, and the embossing 3500 prevents the damping case 3000 from rotating in a circumferential direction thereof.

The embodiments are installed in a variable compressor where the suction damping cases 300 and 3000 are installed.

Advantageous Effects

The suction damping case according to the embodiment of the present disclosure is provided with a structure which replaces the suction check valve, so that the weight of the suction damping case can be reduced and rotations of the suction damping case in the axial and circumferential directions by suction pulsation of the refrigerant can be prevented.

Also, in the assembly of the suction damping case to the rear housing by a worker, the productivity is enhanced by improving the assembly structure, and noise generated during the refrigerant suction is reduced through the improvement of the structure of the suction damping case.

DETAILED DESCRIPTION

Hereinafter, a suction damping case according to an embodiment of the present disclosure will be described in detail with reference to the accompanying drawings.

Figure 1:
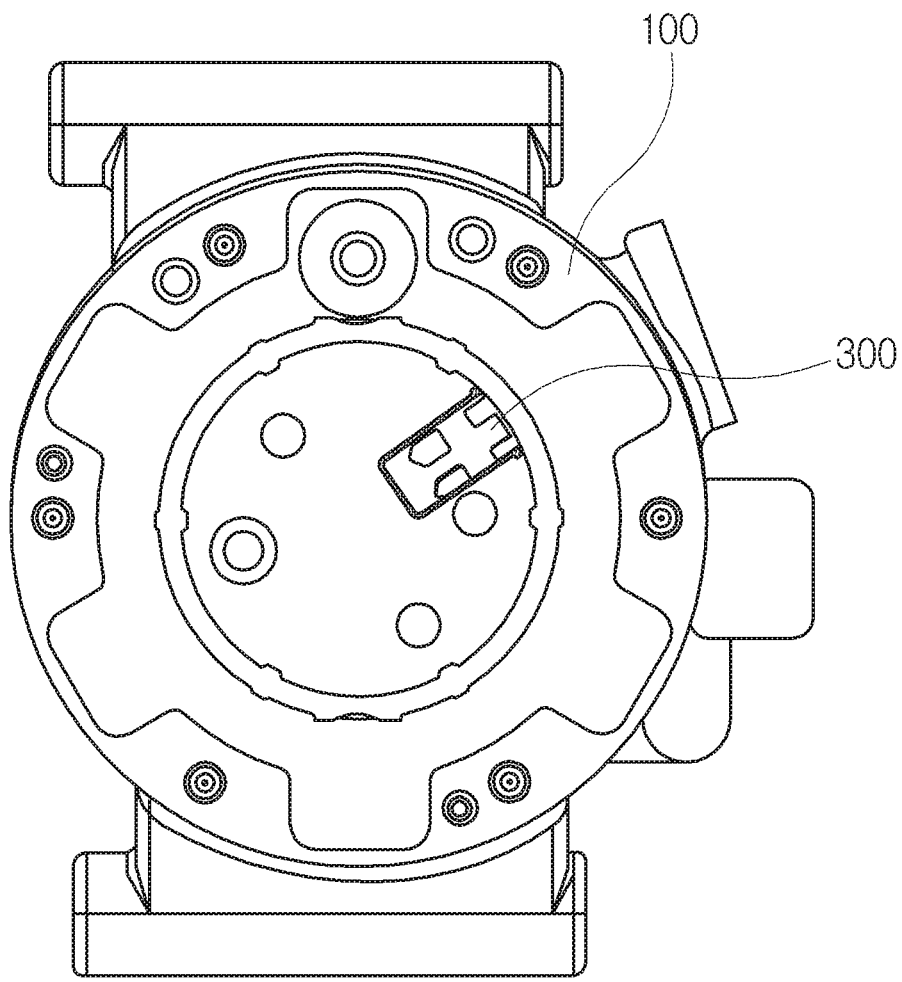
FIG. 1 is a plan view showing an installation position of a suction damping case for a variable compressor according to an embodiment of the present disclosure.
Figure 2:
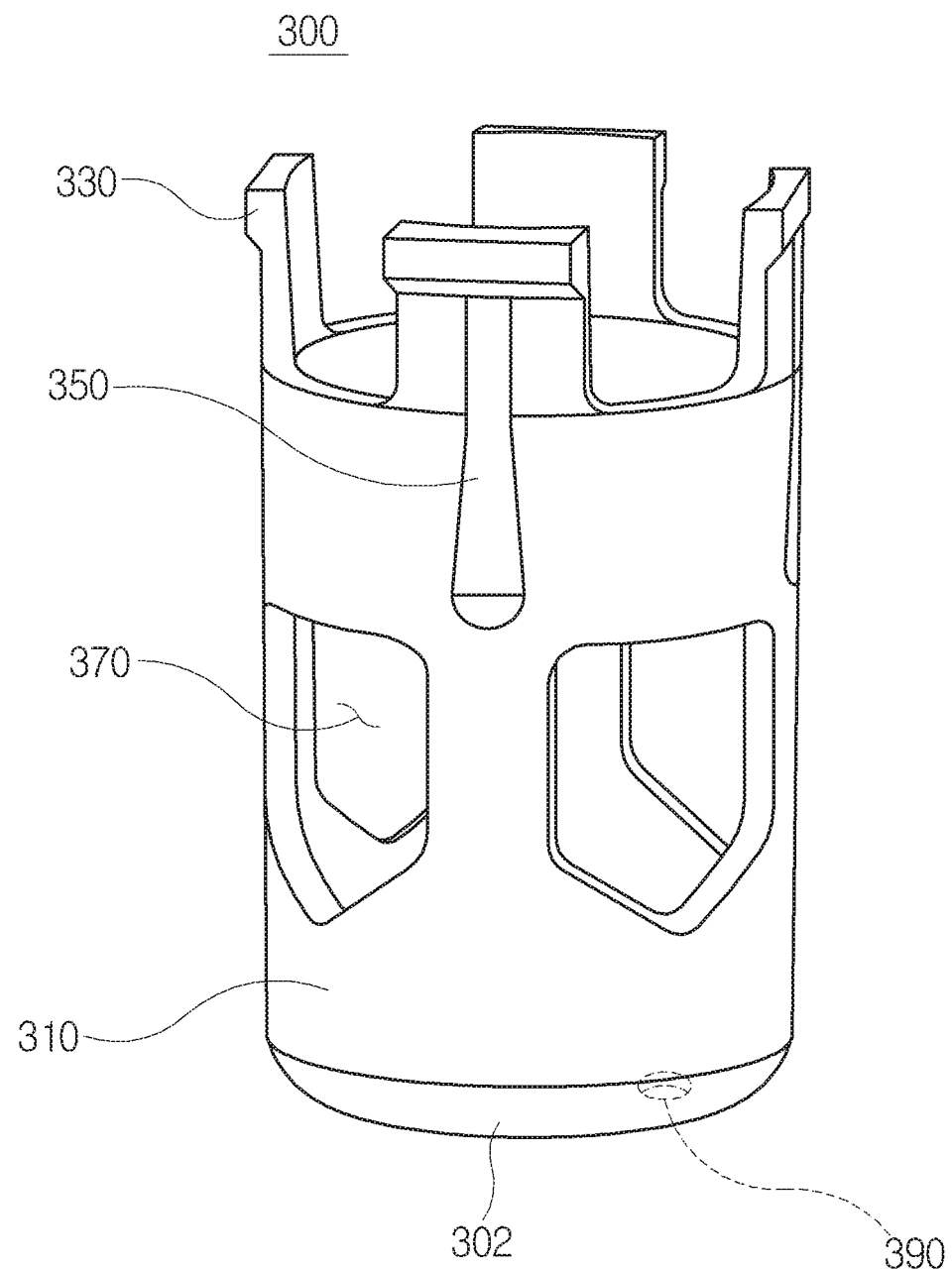
FIG. 2 is a perspective view showing the suction damping case according to a first embodiment of the present disclosure.
Figure 3:
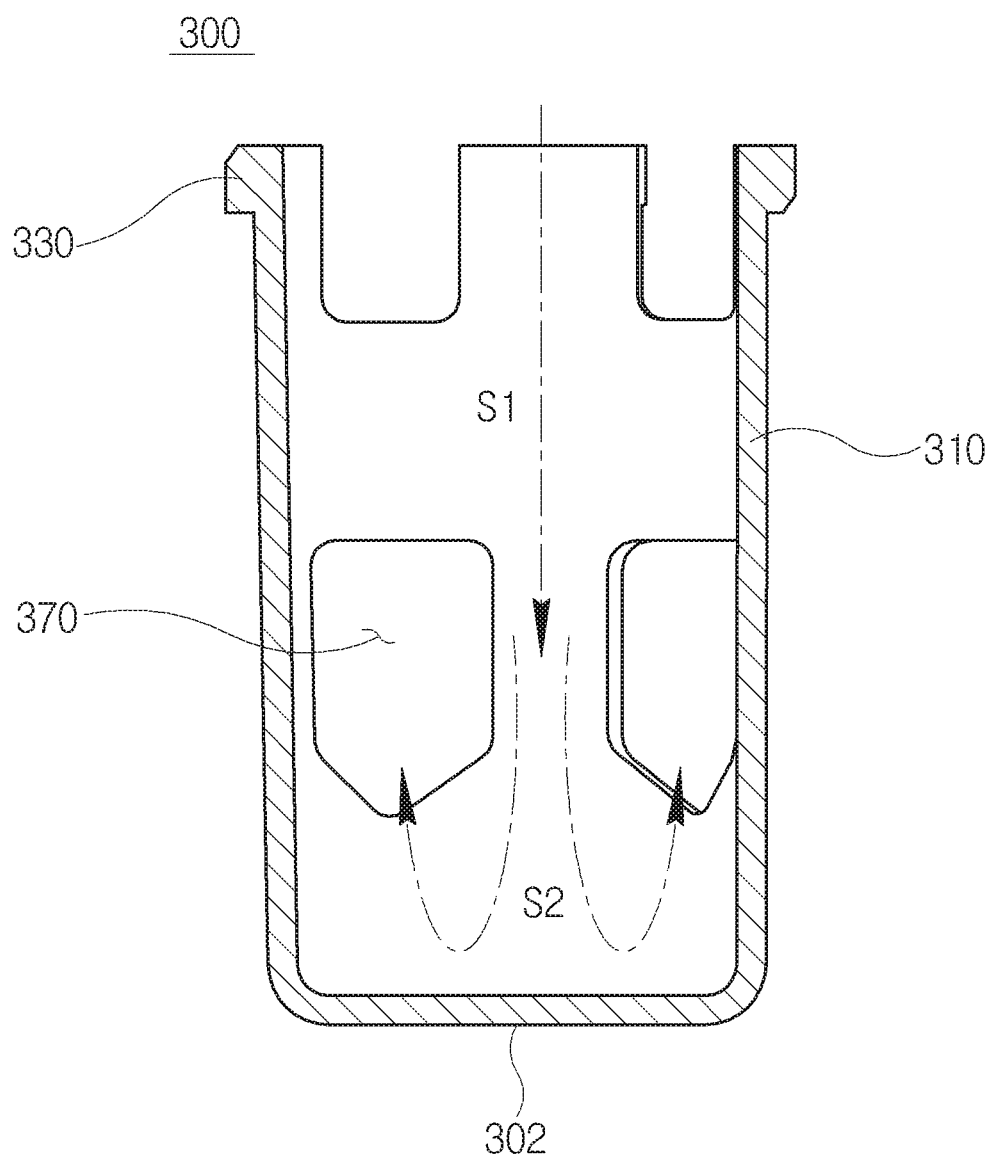
FIG. 3 is a cross sectional view showing an example which indicates a hook of the suction damping case according to the first embodiment of the present disclosure and a flow of a refrigerant.
Figure 4:
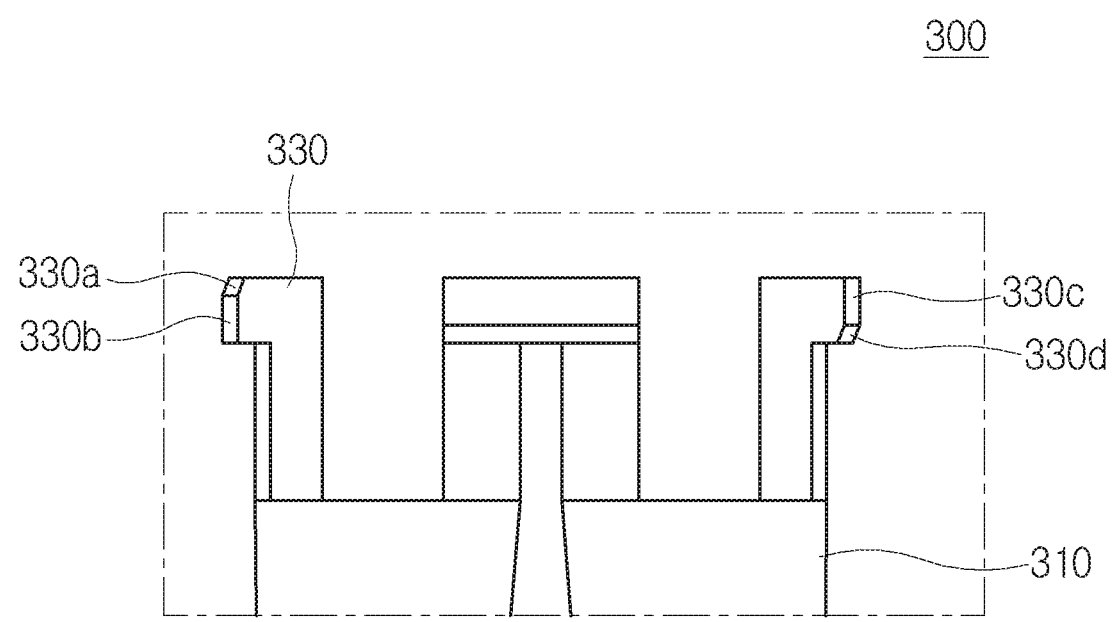
FIG. 4 is a view showing a coupling structure of the suction damping case according to FIG. 2.

FIG. 1 is a plan view showing an installation position of a suction damping case for a variable compressor according to an embodiment of the present disclosure. FIG. 2 is a perspective view showing the suction damping case according to a first embodiment of the present disclosure. FIG. 3 is a cross sectional view showing an example which indicates a hook of the suction damping case according to the first embodiment of the present disclosure and a flow of a refrigerant. FIG. 4 is a view showing a coupling structure of the suction damping case according to FIG. 2.

Referring to FIGS. 1 to 4, a suction damping case 300 for a variable compressor according to the embodiment of the present disclosure is also referred to as SDD (Suction damping device) and is mounted on a rear housing 100 of the variable compressor.

The suction damping case 300 is mounted between a suction port 102 and a suction chamber 2 formed in the rear housing 100 and functions to selectively block a flow of a refrigerant.

Figure 5:
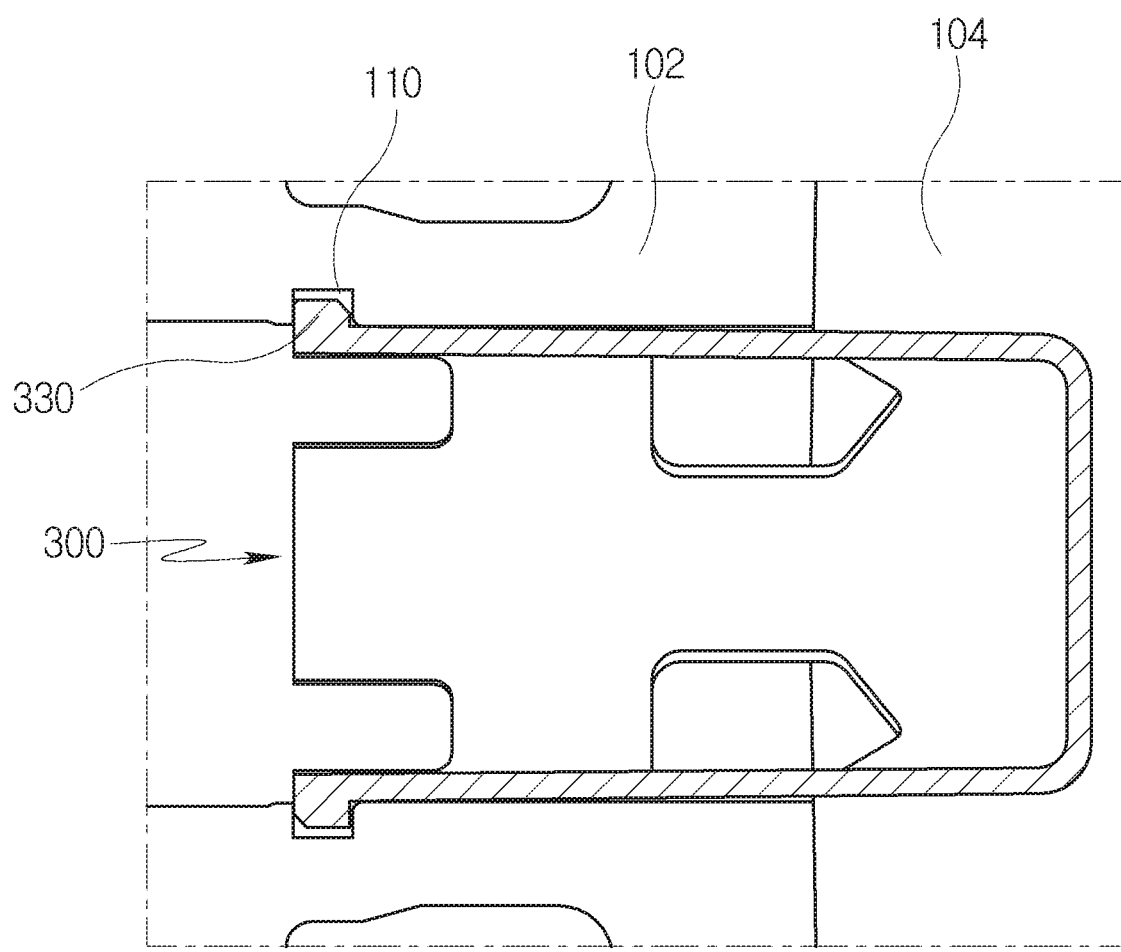
FIG. 5 is a view showing a state where the suction damping case according to the first embodiment of the present disclosure has been coupled to a hook groove.

For reference, a reference numeral 102 shown in FIG. 5 represents the suction port of the rear housing 100, and a reference numeral 104 represents the suction chamber.

The suction damping case 300 according to the embodiment includes a body 310 formed with a first section S1 in which one cylindrical end thereof is opened to allow the refrigerant to be introduced thereinto and the introduced refrigerant moves along the inside thereof, and with a second section S2 in which since the other end thereof is blocked by an end wall 302, the refrigerant moves in an axial direction thereof and then comes into contact with the end wall 302, so that the refrigerant flows for a predetermined period of time at reduced pressure and speed, a hook 330 formed integrally with the open end of the body 310, an embossing 350 protruding from an outer circumferential surface of the body 310 lest the body 310 should be rotated by vibration after the body 310 is installed in the rear housing 100, and a plurality of windows 370 formed to pass through the body 310 such that the refrigerant which has passed through the second section S2 is discharged to the suction chamber.

One end (12 o'clock position) of the body 310 is opened to allow the refrigerant to be introduced thereinto. The end wall 302 (6 o'clock position) is formed on the end extending downward in the axial direction of the body 310.

Since the body 310 is formed in the form of a cylinder, the refrigerant moves within the body 310. The first section S1 and the second section S2 are formed with respect to the axial direction.

The first section S1 corresponds to a section where the window 370 to be described below is formed with respect to the axial direction of the body 310. The first section S1 corresponds to a section where the refrigerant moves in the direction of a straight arrow marked with an alternated long and short dash line when the refrigerant is introduced into the body 310.

The first section S1 is in communication with the below-described second section S2. The refrigerant moves to the second section S2 via the first section S1, and then is discharged through the window 370.

The second section S2 is formed from an inner end to a position where the window 370 is formed, with respect to the longitudinal direction of the body 310. After the refrigerant is introduced into the first section S1, the refrigerant comes into contact with the end wall 302 first without being discharged immediately through the window 370, and then the pressure and speed of the refrigerant are reduced.

Since the window 370 is not formed in the second section S2, the refrigerant moves to the end wall 302 first and then comes into contact with the second section S2. When the refrigerant moves from the first section S1 to the second section S2, the refrigerant flows in accordance with a movement trajectory marked with an alternated long and short dash line shown in the drawing and is discharged through the window 370.

In this case, after the pressure and speed of the refrigerant are reduced while the refrigerant flows in the second section S2 for a predetermined period of time, the refrigerant is discharged through the window 370.

When a pulsation is generated intermittently or continuously during the operation of the variable compressor, problems due to vibration may be caused.

For example, the initial pressure and speed of the refrigerant which is introduced into the body 310 are high. If the refrigerant is discharged directly toward the window 370 in the first section S1, the pulsation due to the pressure and speed of the refrigerant may be generated. According to the embodiment for the purpose of solving in advance the problems due to the pulsation, the first section S1 and the second section S2 are formed within the suction damping case 300, so that the refrigerant passes through the second section S2 and then is discharged to the window 370. Therefore, the pressure and speed of the refrigerant are reduced as compared with the initial pressure and speed of the refrigerant which is introduced into the first section S1, so that problems due to unnecessary vibration and noise are minimized.

For reference, the windows 370 are formed in the first section S1 of the body 310 and are spaced at the same interval in the circumferential direction of the body 310.

In this case, when the pulsation of the refrigerant is generated, the refrigerant radially moves outward through the window 370, so that a phenomenon in which the refrigerant is not discharged at a specific location does not occur.

Therefore, since the refrigerant moves stably through the window 370, the generation of vibration and noise is minimized.

The windows 370 according to the present embodiment are passed through in the circumferential direction of the body 310 and are spaced at the same interval.

The plurality of windows 370 are provided, and is formed to pass through the body 310 and is formed to be spaced apart from the blocked end by a predetermined interval. The window 370 may be formed to have a predetermined size and may be formed in a polygonal shape such as a quadrangular shape, a pentagonal shape, etc.

It is preferable that the window 370 has a width (a width in a direction perpendicular to the longitudinal direction of the body) at least equal to or greater than the distance between the two hooks 330. The window 370 serves as a passage through which the refrigerant is introduced into the suction damping case 300 and collides with the end wall 302 and is cancelled, and then flows again toward the introduction direction and flows out. Oil in the refrigerant may remain while the refrigerant introduced into the body 310 flows out. Therefore, an oil hole 390 is formed to discharge the oil.

According to the present embodiment, the suction damping case 300 further includes the oil hole 390 formed in the end wall 302 of the body 310. The oil hole 390 is formed in a direction in which gravity acts when the body 310 is installed in the rear housing 100.

The body 310 has the hook 330 formed on one open end with respect to the axial direction thereof. The hook 330 is provided in order for the body to be stably coupled with the rear housing 100.

A plurality of the hooks 330 extend outward by a predetermined length on the basis of the drawing from the circumferential direction of the upper end of the body 310. The hook 330 protrudes only from a certain section of the body 310 without protruding throughout the circumferential direction of the body 310. For example, four hooks 330 are provided.

The hook 330 protrudes in the form of a polygon outward in the radial direction of the body 310 from the extended end so as to be caught when being coupled with the rear housing 100. The hook 330 can be variously changed without being limited to the form shown in the drawing and may protrude in a rounded shape.

The reason why the hook 330 is formed in a polygonal shape is to increase a coupling force caused by surface contact when the hook 330 is coupled to a below-described hook groove 110, thereby preventing the suction damping case 300 from moving in the axial direction.

The hooks 330 according to the present embodiment are disposed to face each other in the right and left direction and in the front and rear direction on the upper end of the body 310 on the basis of the drawing.

In the case where the hooks 330 are disposed to face each other in this way, when the suction damping case 300 is coupled to the rear housing 100, all four coupling points are formed. The coupling points play an important role in maintaining the suction damping case 300 to be stably fixed.

In particular, since a phenomenon in which the suction damping case 300 is separated or detached in the axial direction does not occur, problems due to the pulsation of the refrigerant are prevented and a stable operation of a swash plate type compressor may be achieved.

Referring to the accompanying FIGS. 3 to 5, in the hook 330 according to the present embodiment, the shape of the hook protruding outward is formed asymmetrically with the hook 330 facing each other. Here, the asymmetry means that the hook 330 shown on the left side of FIG. 3 is not symmetrical with the protruding shape of the hook shown on the right side.

In this case, when the hook 330 is coupled to the hook groove 110, the coupling force caused by surface contact is improved, thereby preventing the suction damping case 300 from being separated or detached in the axial direction. The hook 330 is inserted into the hook groove 110 formed in the rear housing 100. The hook groove 110 into which the hook 330 is inserted is formed in the rear housing 100, so that the hook 330 is, as shown in the drawing, coupled to the hook groove. Therefore, the coupling force in the axial direction is, as described above, improved.

As described above, for example, the hooks 330 according to the present embodiment are disposed to face each other in the right and left direction on the upper end of the body 310. For the purpose of improving the coupling force when the hook 330 is coupled to the hook groove 110 of the rear housing 100, the hook 330 shown on the left side of the drawing is composed of a first chamfer 330a inclined downward at a predetermined angle and a second chamfer 330b extending vertically downward by a predetermined length from the extended end of the first chamfer 330a.

Also, another hook 330 shown on the right side of the drawing is composed of a third chamfer 330c extending vertically downward and a fourth chamfer 330d inclined inward by a predetermined length from the extended end of the third chamfer 330c.

As such, in the hook 330 shown on the left side, the first chamfer 330a is formed first, and then the second chamfer 330b is extended. In the hook 330 shown on the right side, the third chamfer 330c is formed first, and the fourth chamfer 330d is extended.

In the present embodiment, the third chamfer 330c is disposed at a position facing the first chamfer 330a, and the shapes of them are different from each other. Also, the fourth chamfer 330d is dispose at a position facing the second chamfer 330b, and the shapes of them are different from each other.

As described above, since the shapes of the first to fourth chamfers 330a, 330b, 330c, and 330d are different, when the hook 330 is coupled to the hook groove 110, the surface contact point in the axial direction increases, thereby improving the coupling force.

When the hook 330 is configured as described above, even if the suction damping case 300 moves or rotates at a predetermined angle, at least some of the plurality of hooks 330 may maintain the coupled state. Accordingly, when the hook 330 is formed as shown in FIG. 5, the fixing force of the suction damping case 300 is improved, and the coupling force in the axial direction is improved at the same time.

Figure 6:
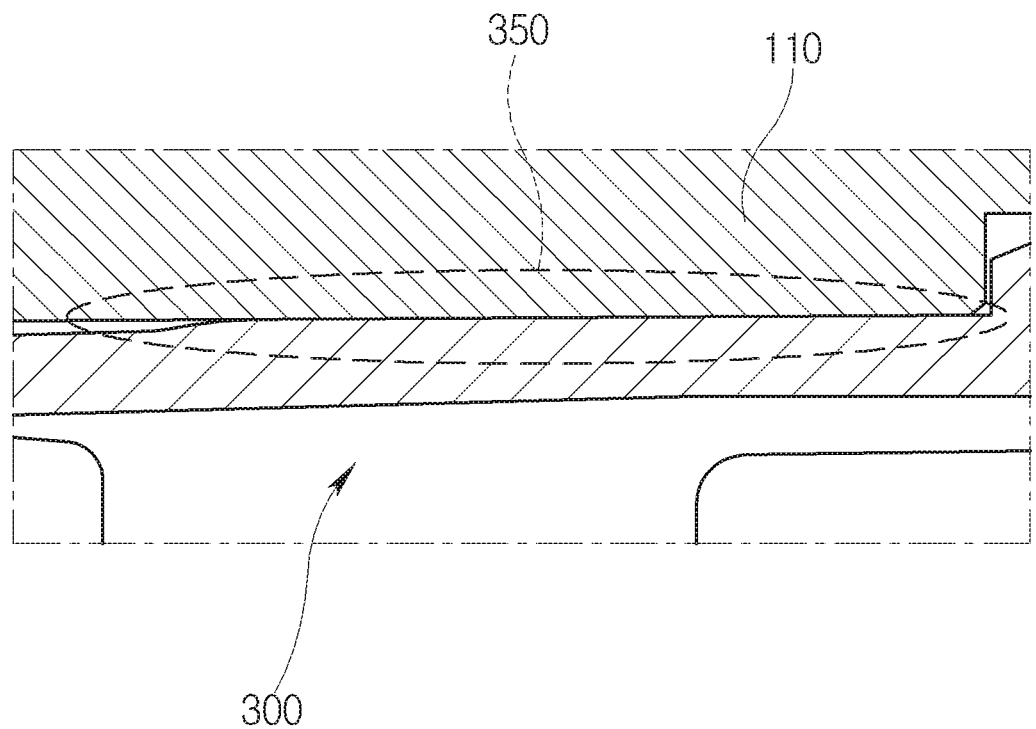
FIG. 6 is a view showing a coupling state by an embossing according to the first embodiment of the present disclosure.

Referring to the accompanying FIG. 6, when the suction damping case 300 is inserted into the rear housing 100, the embossing 350 according to the present embodiment comes into line contact with and is closely coupled to the inner circumferential surface of the insertion portion of the rear housing 100.

A space of the rear housing 100 into which the suction damping case 300 is inserted is formed corresponding to the shape and size of the body 310 of the suction damping case 300.

The embossing 350 protrudes outward from the outer circumferential surface of the body 310. Therefore, the embossing 350 comes into close contact with the inner circumferential surface of the receiving space of the rear housing 100 while having been inserted into the rear housing 100, so that the suction damping case 300 can be prevented from rotating.

A portion of the embossing 350 is located on the outer circumferential surface of the body 310, and the remaining portion is located on the outer circumferential surface of the hook 330. The embossing 350 is located at a position for increasing the fixing force by preventing the rotation or movement of the hook 330. However, the embossing 350 may be provided between the hooks 330 by changing the degree of protrusion of the embossing 350.

Figure 7:
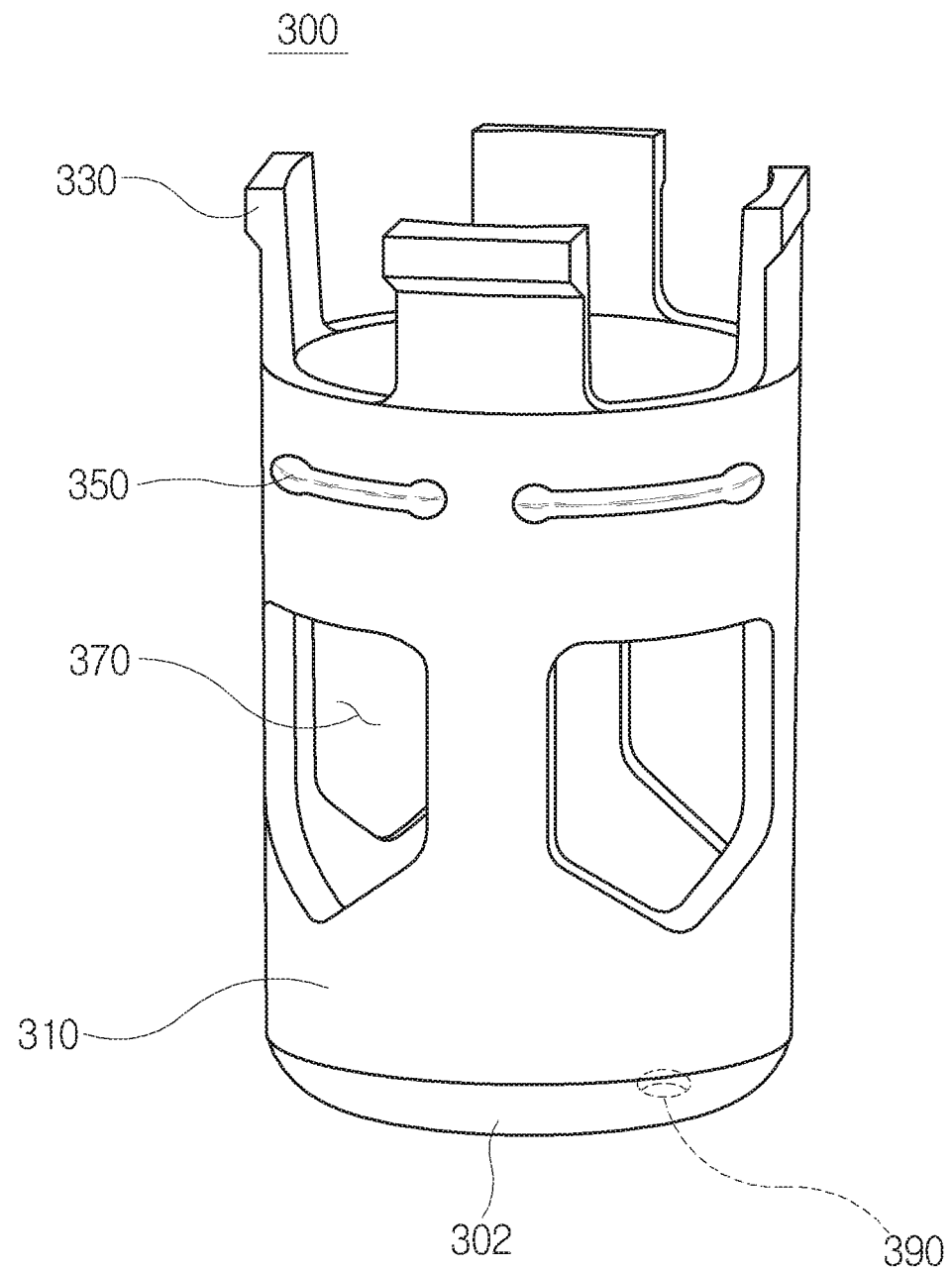
FIG. 7 is a view showing modified embodiments of the embossing according to the first embodiment of the present disclosure.

Referring to the accompanying FIG. 2 or 7, the embossing 350 according to the present embodiment extends from the hook 330 to the window 370, and the extended end is located between the plurality of windows 370. The embossing 350 protrudes in the longitudinal direction of the body 310 and is provided to prevent the damping case 300 from rotating in the circumferential direction.

The embossing 350 corresponds to a protrusion formed to have a predetermined height and length from the outer circumferential surface of the body 310. When the embossing 350 is inserted into the rear housing 100, the embossing 350 is closely coupled to the inner circumferential surface of the rear housing 100.

The hook 330 according to the present embodiment can prevent the damping case 300 from moving in the axial direction with respect to the direction in which the damping case 300 is coupled, and the embossing 350 can prevent the damping case 300 from rotating in the circumferential direction. Therefore, even when vibration is generated due to the pulsation of the refrigerant or an external impact is transmitted to the suction damping case 300, the damping case is not separated or detached from the hook groove 110 of the rear housing 100.

The embossing 350 according to another embodiment of the present disclosure protrudes in the circumferential direction of the body 310. In this case, the hook 330 prevents the damping case 300 from moving in the axial direction with respect to the direction in which the damping case 300 is coupled, and the embossing 350 prevents the damping case 300 from rotating in the circumferential direction. Therefore, even when the pulsation of the refrigerant is generated, the coupling force in the rear housing 100 is improved.

Figure 8:
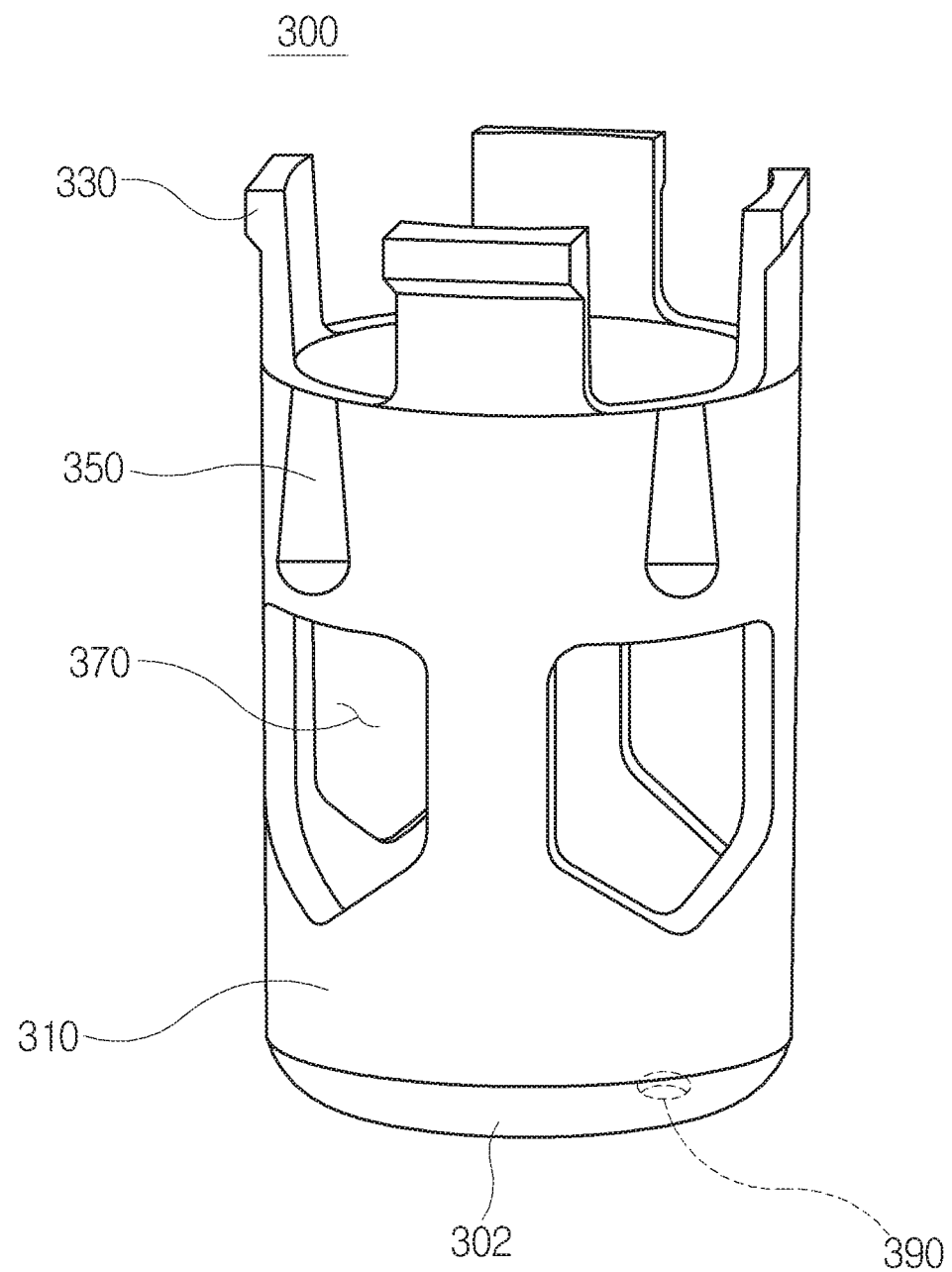
FIG. 8 is a view showing modified embodiments of the embossing according to the first embodiment of the present disclosure.

Referring to the accompanying FIG. 8, unlike the above-described embodiment, the embossing 350 according to the present embodiment is formed in the longitudinal direction of the body 310 and is located between the hooks 330 formed in the circumferential direction of the body 310.

The embossing 350 is located at a position that does not overlap the hook 330. Even when the suction damping case 300 rotates in the circumferential direction, the initial coupled state is stably maintained.

Figure 9:
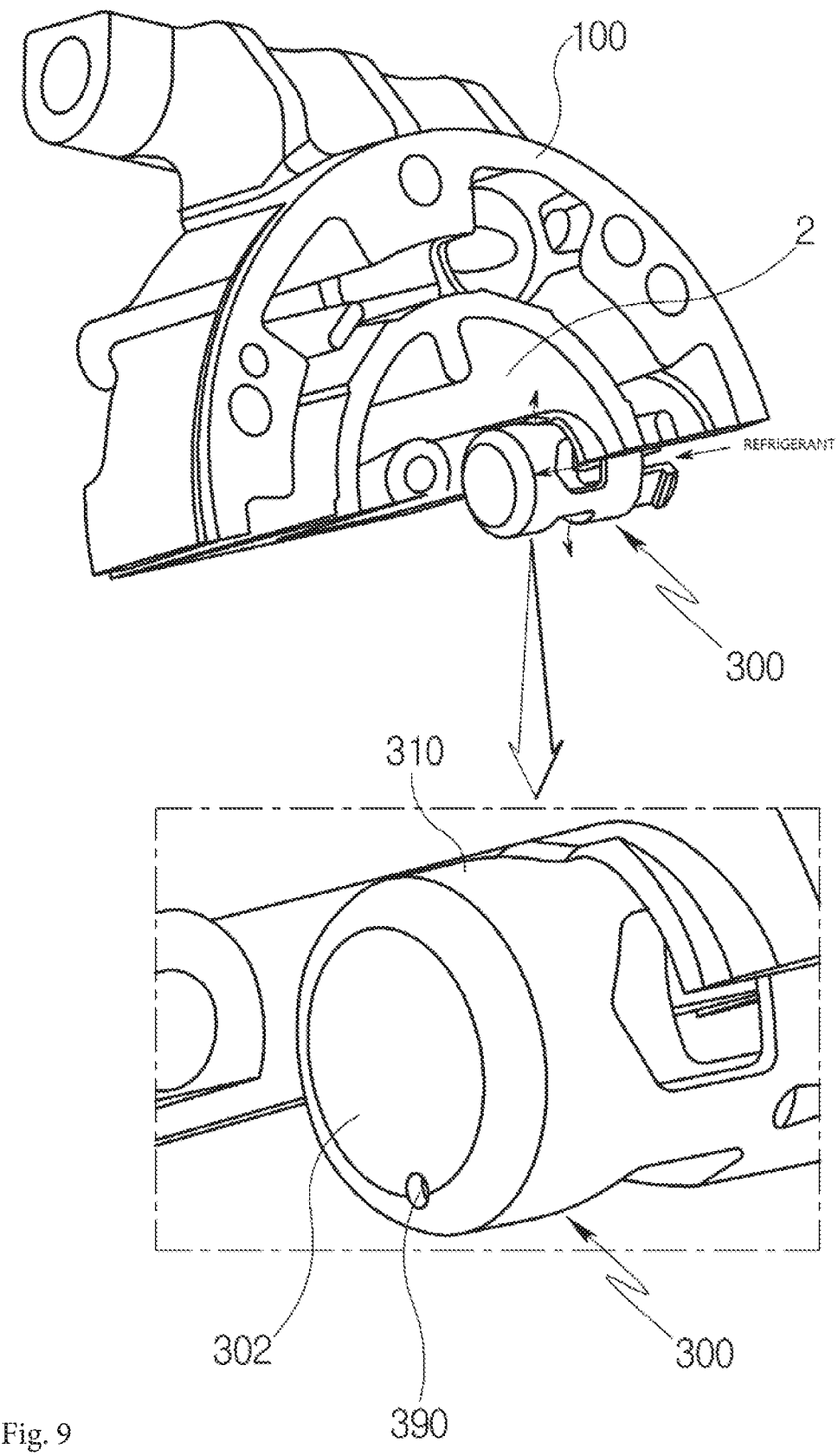
FIG. 9 is a partial perspective view showing a state where a suction damping case according to a second embodiment of the present disclosure has been installed in a rear housing.

Referring to the accompanying FIG. 9, the suction damping case 300 is installed between the suction chamber and the suction port of the rear housing 100, and the downward direction based on FIG. 6 is the direction of gravity. Oil within the body 310 of the suction damping case 300 collects downward.

Therefore, it is preferable that the oil hole 390 is formed in the blocked end of the body 310 and is formed to respond to the direction in which the oil remains. The remaining oil is discharged to the outside of the suction damping case 300 through the oil hole 390.

In a check valve for a variable compressor, which has the above structure in accordance with the embodiment of the present disclosure, the flow of refrigerant and a function of the check valve will be described as follows.

The suction damping case 300 functions as the check valve even only by the body 310, and the refrigerant is introduced from the suction port to the open end of the body 310. The introduction direction of the refrigerant is the direction of an arrow. Since the pressure of the refrigerant introduced into the suction damping case 300 is greater than the pressure of the refrigerant flowing inside the body 310, the refrigerant does not flow backward toward the open end of the body 310.

The refrigerant is introduced into the body 310 and then collides with the end wall 302 of the body 310, and the pressure and speed of the refrigerant are reduced. The pulsation which is generated when the refrigerant is introduced forms a waveform. The amplitude of the waveform of the pulsation of the refrigerant going back toward the window 370 after colliding with the inside of the body 310 is reduced.

Therefore, since the pressure and flow of the refrigerant are cancelled, the blocked end wall 302 of the body 310 may be defined as a region in which the refrigerant is cancelled. After the pressure is cancelled, the refrigerant has a pressure lower than the pressure at which the refrigerant is introduced. Therefore, the refrigerant is discharged toward the window 370. The refrigerant discharged to the window 370 flows into the suction chamber 2 of the rear housing 100.

The above embodiment has described that the window has a polygonal shape having a predetermined size as an example. However, the window may have a shape having a plurality of pores.

A suction damping case according to a second embodiment of the present disclosure will be described with reference to the drawings.

Figure 10:
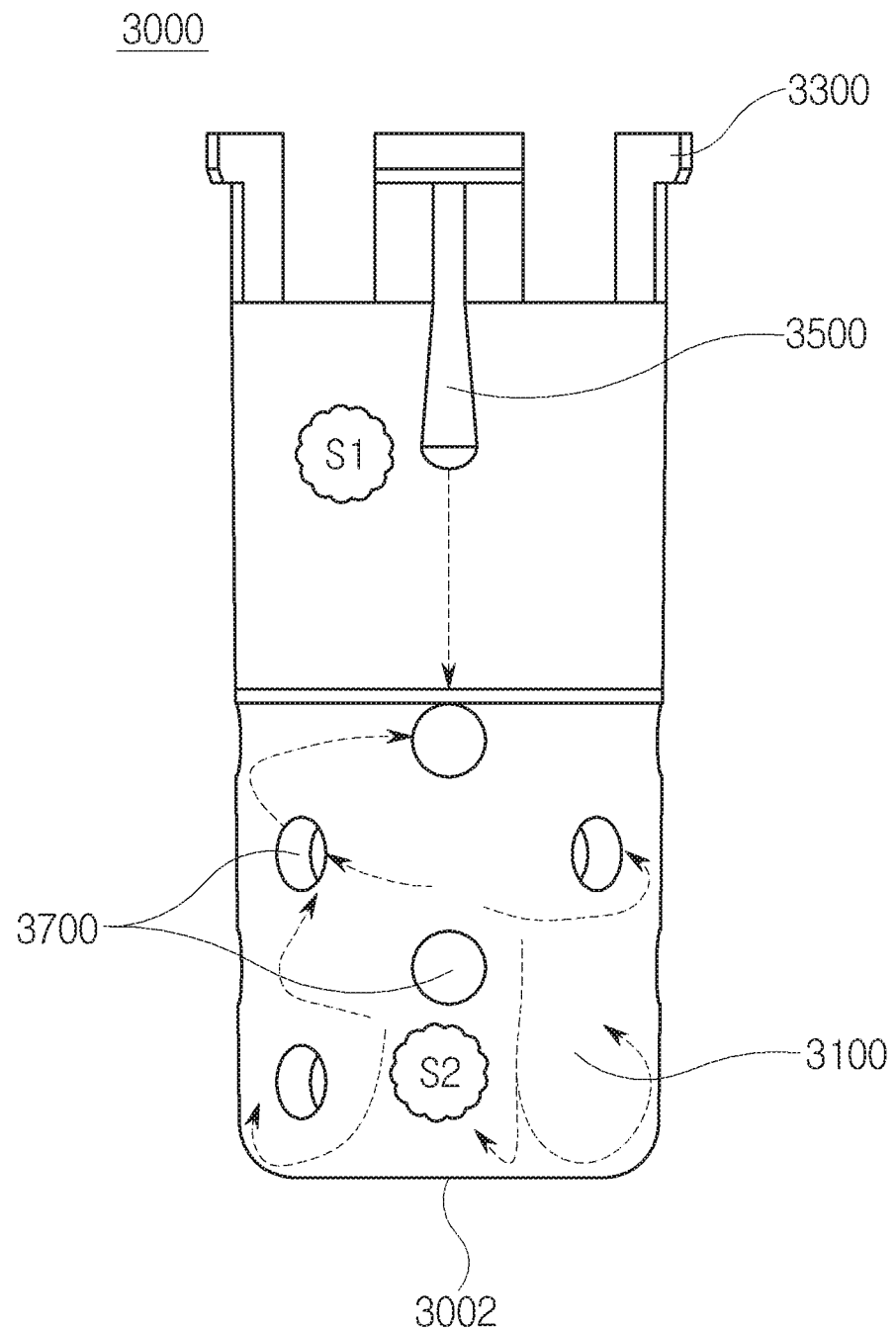
FIG. 10 is a view showing the suction damping case according to the second embodiment of the present disclosure and a moving flow of a refrigerant.

Referring to the accompanying FIG. 10, the suction damping case according to the present embodiment is installed between a suction port and a suction chamber formed in a rear housing 100 of the compressor.

The suction damping case includes a body 3100 formed with a first section S1 in which one cylindrical end thereof is opened to allow the refrigerant to be introduced thereinto and the introduced refrigerant moves along the inside thereof, and with a second section S2 in which since the other end thereof is blocked by an end wall 3002, the refrigerant moves in an axial direction thereof and then comes into contact with the end wall 3002, so that the refrigerant flows for a predetermined period of time at reduced pressure and speed, a hook 3300 formed integrally with the open end of the body 3100, an embossing 3500 protruding from an outer circumferential surface of the body 3100 lest the body 3100 should be rotated by vibration after the body 3100 is installed in the rear housing 100, and a plurality of refrigerant holes 3700 which are spaced apart from each other in a circumferential direction and in a longitudinal direction of the body 3100 and are opened at different heights in the longitudinal direction of the body 3100 with respect to the end wall 3002.

In this embodiment, unlike the first embodiment described above, the window 370 is removed and the plurality of refrigerant holes 3700 are formed. Also, since actions of the first section S1, the second section S2, and the end wall 3002 are similar, a detailed description thereof will be omitted.

The refrigerant hole 3700 is opened outward in a radial shape throughout the circumferential direction of the body 3100. Therefore, when the pressure is changed by the pulsation of the refrigerant, the refrigerant is stably discharged in the second section S2 in which the plurality of refrigerant holes 3700 are formed.

In particular, since the plurality of refrigerant holes 3700 are opened at different heights in the circumferential direction and in the longitudinal direction of the body 3100 with respect to the end wall 3002, the refrigerant which has collided with the end wall 3002 radially moves to the outside of the body 3100 through the open refrigerant hole 3700, so that pressure change due to the pulsation is stably removed.

For example, it is preferable that the refrigerant collides with the end wall 3002 and then generates the movement trajectory as shown in FIG. 3. However, as shown by dotted arrows, the movement trajectory shows irregular flows due to the pulsation.

In a case where the refrigerant is, as shown in the drawing, moved at different heights in the circumferential direction and in the longitudinal direction of the second section S2, when the refrigerant is discharged to the outside of the body 3100 through the refrigerant hole 3700, it is possible to minimize the generation of the impact due to the pulsation.

Figure 11:
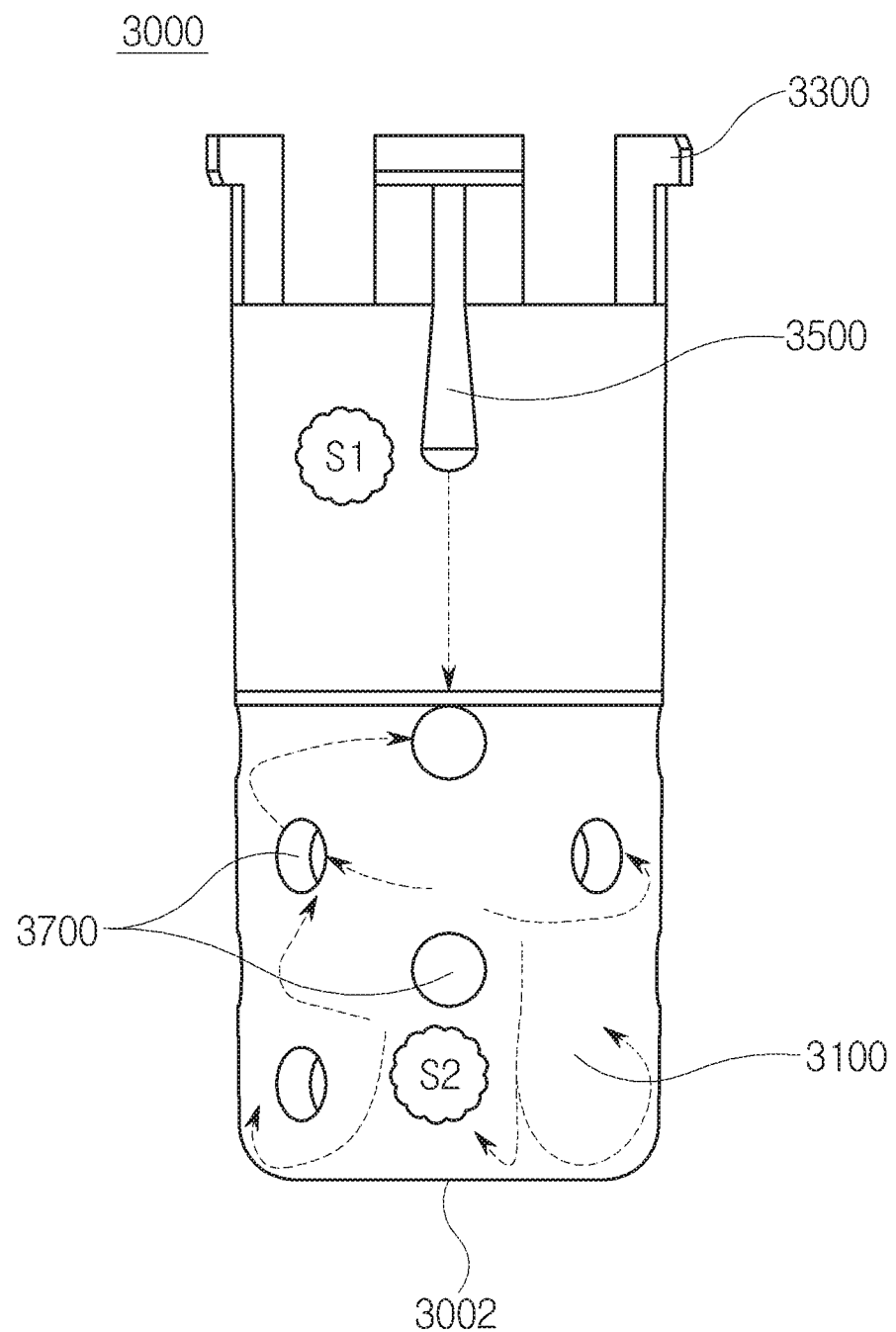
FIG. 11 is a view showing a hook according to the second embodiment of the present disclosure.

Referring to the accompanying FIG. 11, the hook 3300 is formed to extend in a longitudinal direction of the body 3100 from an end of the body 3100. The hooks 3300 are arranged to face each other as viewed from the top surface of the case 3000 and a hook shape protruding outward is formed asymmetrically with the hooks 3300 facing each other.

Here, the asymmetry means that the hook 3300 shown on the left side of FIG. 11 is not symmetrical with the protruding shape of the hook shown on the right side.

In this case, when the hook 3300 is coupled to a hook groove (not shown), the coupling force caused by surface contact is improved, thereby preventing the suction damping case 3000 from being separated or detached in the axial direction.

The hook 3300 protrudes in the form of a polygon outward in the radial direction of the body 3100 from the extended end so as to be caught when being coupled with the rear housing 100. The hook 3300 can be variously changed without being limited to the form shown in the drawing and may protrude in a rounded shape.

The hook 3300 according to the present embodiment are disposed to face each other in the right and left direction and in the front and rear direction on the upper end of the body 3100 on the basis of the drawing.

In the case where the hooks 3300 are disposed to face each other in this way, when the suction damping case 3000 is coupled to the rear housing 100, all four coupling points are formed. The coupling points play an important role in maintaining the suction damping case 3000 to be stably fixed.

In particular, since a phenomenon in which the suction damping case 3000 is separated or detached in the axial direction does not occur, problems due to the pulsation of the refrigerant are prevented and a stable operation of a swash plate type compressor may be achieved.

One end of the embossing 3500 is adjacent to the hook 3300 and the other end extends in the longitudinal direction of the body 3100.

The hook 3300 prevents the damping case 3000 from moving in an axial direction with respect to a direction in which the damping case 3000 is coupled, and the embossing 3500 prevents the damping case 3000 from rotating in a circumferential direction thereof. Accordingly, the suction damping case 3000 is prevented from being separated.

The refrigerant hole 3700 may be formed to a ½ point in the longitudinal direction from an end wall 3003 of the body 3100.

As such, since the flowing refrigerant is stayed when discharged, it is possible to obtain the function of the check valve even by only the body having a simple structure. Accordingly, the weight of the suction check valve can be reduced, and noise generated during the refrigerant suction can be prevented by removing the structure that generates noise. Also, there is an effect of improving the productivity by improving the assembly structure.

This embodiment is installed in a variable compressor in which the suction damping case 3000 is installed.

In this case, vibration and noise due to pulsation is reduced after the refrigerant is introduced into the suction damping case 300, so that the noise reduction effect is improved, and the noise transmitted to a driver or passenger who is inside the vehicle is attenuated. Accordingly, quiet driving can be achieved.

INDUSTRIAL APPLICABILITY

The embodiments of the present disclosure may provide a compressor equipped with a suction damping case capable of minimizing noise generated by the discharge of the refrigerant.

What is claimed is:

1. A suction damping case for a compressor, which is installed between a suction chamber and a suction port formed on a rear housing of the compressor, the suction damping case comprising:
a body formed with a first section S1 in which one cylindrical end thereof is opened to allow the refrigerant to be introduced thereinto and the introduced refrigerant moves along the inside thereof, and with a second section S2 in which since the other end thereof is blocked by an end wall, the refrigerant moves in an axial direction thereof and then comes into contact with the end wall, so that the refrigerant flows for a predetermined period of time at reduced pressure and speed;
hooks formed integrally with the open end of the body;
an embossing protruding from an outer circumferential surface of the body,
a plurality of windows formed to pass through the body such that the refrigerant which has passed through the second section S2 is discharged to the suction chamber,
wherein the hooks are formed to extend in a longitudinal direction of the body from the open end of the body, wherein the hooks are arranged to face each other as viewed from a top surface of the open end, and wherein a hook shape of the hooks protruding outward is formed asymmetrically with the hooks facing each other.

2. The suction damping case of claim 1, wherein one end of the embossing is adjacent to the hooks and an other end extends in a longitudinal direction of the body.

3. The suction damping case of claim 1, wherein the body is inserted into the rear housing, the embossing comes in close contact with an inner circumferential surface of the rear housing.

4. The suction damping case of claim 1, wherein the hooks prevent the damping case from moving in the axial direction with respect to a direction in which the damping case is coupled, and the embossing prevents the damping case from rotating in a circumferential direction thereof.

5. The suction damping case of claim 1, wherein the embossing protrudes in a circumferential direction of the body.

6. The suction damping case of claim 1, wherein the windows are spaced at the same interval in a circumferential direction of the body.

7. The suction damping case of claim 1, wherein the hooks are configured to be inserted into a hook groove formed in a position of the rear housing which corresponds to the hooks.

8. The suction damping case of claim 1, wherein a window is formed in the first section S1 of the body.

9. The suction damping case according to claim 1 installed in a variable compressor where the suction damping cases are installed.

10. A suction damping case for a compressor, which is installed between a suction chamber and a suction port formed on a rear housing of the compressor, the suction damping case comprising:
a body formed with a first section S1 in which one cylindrical end thereof is opened to allow the refrigerant to be introduced thereinto and the introduced refrigerant moves along the inside thereof, and with a second section S2 in which since the other end thereof is blocked by an end wall, the refrigerant moves in an axial direction thereof and then comes into contact with the end wall, so that the refrigerant flows for a predetermined period of time at reduced pressure and speed;
hooks formed integrally with the open end of the body;
an embossing protruding from an outer circumferential surface of the body,
a plurality of windows formed to pass through the body such that the refrigerant which has passed through the second section S2 is discharged to the suction chamber,
wherein the embossing extends from the hooks to a window of the plurality of windows, and an extended end is located between the plurality of windows.

11. The suction damping case according to claim 10 installed in a variable compressor where the suction damping cases are installed.

12. A suction damping case for a compressor, which is installed between a suction chamber and a suction port formed on a rear housing of the compressor, the suction damping case comprising:
a body formed with a first section S1 in which one cylindrical end thereof is opened to allow the refrigerant to be introduced thereinto and the introduced refrigerant moves along the inside thereof, and with a second section S2 in which since the other end thereof is blocked by an end wall, the refrigerant moves in an axial direction thereof and then comes into contact with the end wall, so that the refrigerant flows for a predetermined period of time at reduced pressure and speed;
hooks formed integrally with the open end of the body;
an embossing protruding from an outer circumferential surface of the body,
a plurality of windows formed to pass through the body such that the refrigerant which has passed through the second section S2 is discharged to the suction chamber,
wherein the embossing is formed in a longitudinal direction of the body and is located between the hooks formed in a circumferential direction of the body.

13. A variable compressor comprising the suction damping case of claim 12.

14. A suction damping case for a compressor, which is installed between a suction chamber and a suction port formed on a rear housing of the compressor, the suction damping case comprising:
a body formed with a first section S1 in which one cylindrical end thereof is opened to allow the refrigerant to be introduced thereinto and the introduced refrigerant moves along the inside thereof, and with a second section S2 in which since the other end thereof is blocked by an end wall, the refrigerant moves in an axial direction thereof and then comes into contact with the end wall, so that the refrigerant flows for a predetermined period of time at reduced pressure and speed;
a hook formed integrally with the open end of the body;
an embossing protruding from an outer circumferential surface of the body,
a plurality of windows formed to pass through the body such that the refrigerant which has passed through the second section S2 is discharged to the suction chamber, and
an oil hole formed in the end wall.

15. The suction damping case of claim 14, wherein the oil hole is formed in a direction in which gravity acts when the body is installed in the rear housing.

16. A variable compressor comprising the suction damping case of claim 14.

17. A suction damping case for a compressor, which is installed between a suction chamber and a suction port formed on a rear housing of the compressor, the suction damping case comprising:
a body formed with a first section S1 in which one cylindrical end thereof is opened to allow the refrigerant to be introduced thereinto and the introduced refrigerant moves along the inside thereof, and with a second section S2 in which since the other end thereof is blocked by an end wall, the refrigerant moves in an axial direction thereof and then comes into contact with the end wall, so that the refrigerant flows for a predetermined period of time at reduced pressure and speed,
hooks formed integrally with the open end of the body,
an embossing protruding from an outer circumferential surface of the body,
a plurality of refrigerant holes which are spaced apart from each other in a circumferential direction and in a longitudinal direction of the body and are opened at different heights in the longitudinal direction of the body with respect to the end wall,
wherein the hooks are formed to extend in the longitudinal direction of the body from the end of the body,
wherein the hooks are arranged to face each other as viewed from a top surface of the case, and wherein a hook shape of the hooks protruding outward is formed asymmetrically with the hooks facing each other.

18. The suction damping case of claim 17, wherein at least one refrigerant hole of the plurality of refrigerant holes is opened outward radially throughout the circumferential direction of the body.

19. The suction damping case of claim 17, wherein the hook prevents the damping case from moving in the axial direction with respect to a direction in which the damping case is coupled, and the embossing prevents the damping case from rotating in a circumferential direction thereof.

20. The suction damping case according to claim 17 installed in a variable compressor where the suction damping cases are installed.

21. A suction damping case for a compressor, which is installed between a suction chamber and a suction port formed on a rear housing of the compressor, the suction damping case comprising:
a body formed with a first section S1 in which one cylindrical end thereof is opened to allow the refrigerant to be introduced thereinto and the introduced refrigerant moves along the inside thereof, and with a second section S2 in which since the other end thereof is blocked by an end wall, the refrigerant moves in an axial direction thereof and then comes into contact with the end wall, so that the refrigerant flows for a predetermined period of time at reduced pressure and speed;
a hook formed integrally with the open end of the body;
an embossing protruding from an outer circumferential surface of the body,
a plurality of refrigerant holes which are spaced apart from each other in a circumferential direction and in a longitudinal direction of the body and are opened at different heights in the longitudinal direction of the body with respect to the end wall,
wherein one end of the embossing is adjacent to the hook and an other end extends in a longitudinal direction of the body.

22. The suction damping case according to claim 21 installed in a variable compressor where the suction damping cases are installed.

* * * * *